US006328668B1

(12) United States Patent
Leggett

(10) Patent No.: US 6,328,668 B1
(45) Date of Patent: Dec. 11, 2001

(54) POSITIVE GEAR ENGAGEMENT TRANSMISSION

(76) Inventor: Aaron D. Leggett, 1896 S. Chickasaw La., Joplin, MO (US) 64804

( * ) Notice: Subject to any disclaimer, the term of this patent is extended or adjusted under 35 U.S.C. 154(b) by 0 days.

(21) Appl. No.: 09/536,374

(22) Filed: Mar. 28, 2000

(51) Int. Cl.$^7$ .................................................. F16H 57/08
(52) U.S. Cl. ............................................................ 475/331
(58) Field of Search ............................................. 475/331

(56) References Cited

U.S. PATENT DOCUMENTS 4,539,867 * 9/1985 Ishimi .................................. 475/331

* cited by examiner

Primary Examiner—Dirk Wright
(74) Attorney, Agent, or Firm—Frank J. Catalano

(57) ABSTRACT

A positive gear engagement transmission affords a continuously variable ratio between input and output rotational speeds. A circular rack journalled for rotation about a center axle or hub has inner and outer arrays of teeth. Inner and outer planet gears have arrays of teeth engaged with each other and with the inner and outer rack array of teeth for counter-rotation about their respective axles. The ratio of the rack array radii is equal to the ratio of the velocities of the planet gears along their racks. One or more linking gears can be used in addition to the planet gears to provide any desired axle orientation and force transmitting structure. A control force is applied to the planet gear support structure so as to apply unidirectional or opposing forces upon the axles of the planet gears to accomplish the variation of energy transferred between the rack and the planet gear assembly.

20 Claims, 7 Drawing Sheets

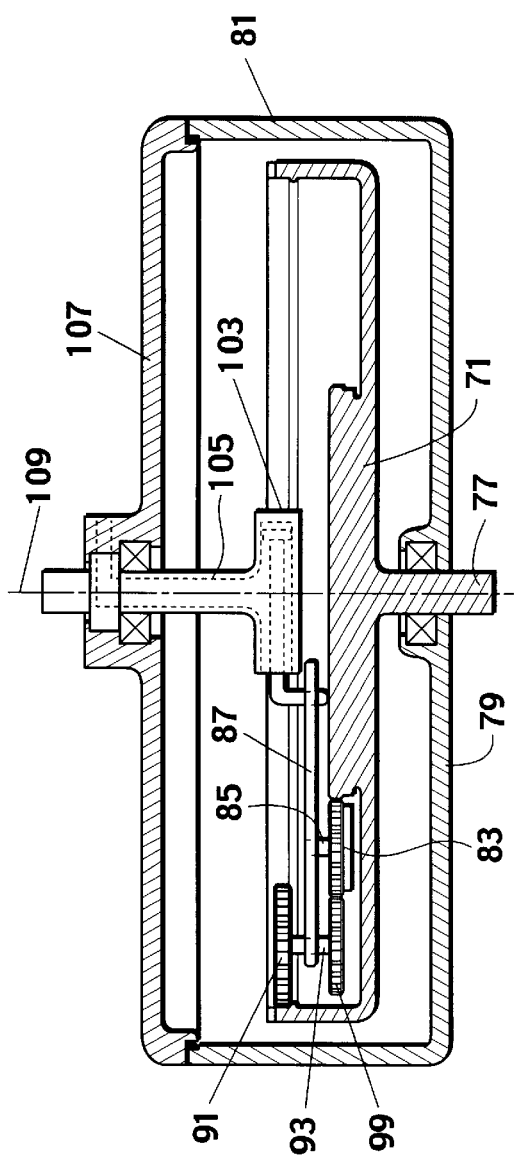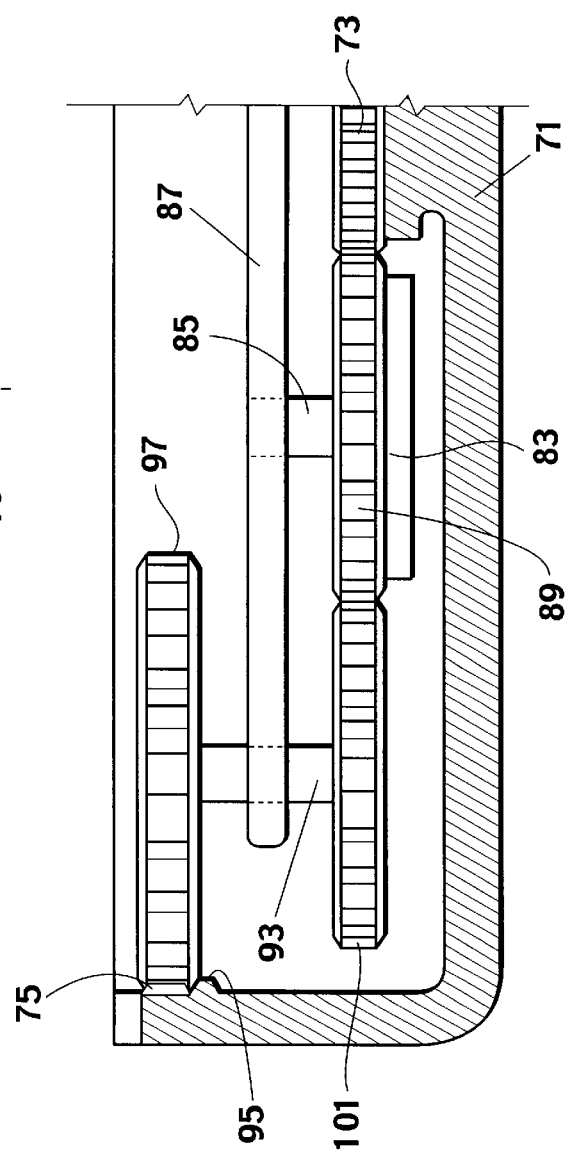

POSITIVE GEAR ENGAGEMENT TRANSMISSION

BACKGROUND OF THE INVENTION

This invention relates generally to devices for transmitting power from an input source to an output source and more particularly concerns a device for varying the rotational speed ratio between input and output sources.

There are many variable transmissions currently in use for receiving input at a first rotational speed and converting it to output at a second rotational speed. Hydraulic pump or turbine transmissions are costly, complicated and generally inefficient. Split pulley transmissions are generally able to handle relatively low power systems but lose much of their input energy to friction between their pulleys and V-belt. Flat drive plate transmissions also have power input limitations and high frictional power loss. Known positive gear engagement transmissions such as described and illustrated in U.S. Pat. No. 5,360,380, suffer from a variety of limitations. They do not provide an infinite number of ratios to choose from and, therefore, must be shifted in synchronization with an interruption in power, resulting in a jerking motion. Synchronization is necessary to avoid mashing planet gear teeth while the diameter of the ring member is changed so as to change ratios. Timing cams or solenoids could be used for synchronization, but high speed operation requires many components which reduce the cost effectiveness and increase the maintenance requirements of the system. My present U.S. Pat. No. 6,132,330 uses positive gear engagement to transmit power from an input to an output at continuously variable speeds but requires a highly modified input planetary drive gear of a resilient nature not common in conventional engineering.

It is, therefore, an object to the present invention to provide a positive gear engagement transmission which is more reliable than known transmissions. Another object of this invention is to provide a positive gear engagement transmission which greatly reduces loss in power due to friction. A further object of this invention is to provide a positive gear engagement transmission with a continuum of selectable gear ratios with smooth transition from one ratio to the next. It is also an object of this invention to provide a positive gear engagement transmission which minimizes the typical slippage problems associated with non-positive gear engagement drive systems. Still another object of this invention is to provide a positive gear engagement transmission with a continuously variable ratio between the input linear or rotational speed and the output speed, which may be varied continuously. Yet another object of this invention is to provide a positive gear engagement transmission which uses conventional gears without radical modification.

SUMMARY OF THE INVENTION

In accordance with the invention a positive gear engagement transmission is provided which affords a continuously variable ratio between input and output rotational speeds. Thus, the input drive may operate at a desired constant speed while the output speed is varied continuously or the input drive speed may be varied while the output speed is held constant. The power transfer utilizes positive gear engagement throughout because energy is moved from one solid or metal component to another without the use of any resilient medium or fluid such as a rubber belt, friction material or oil. Conventional gears need not be modified because characteristics of resilience are not required by the positive gear engagement transmission.

The positive gear engagement transmission employs a circular rack journalled for rotation about a center axle or hub and having inner and outer arrays of teeth. The arrays of teeth are preferably, but not necessarily, opposed. An inner planet gear has a centered rotational axle and an array of teeth engaged with the inner rack array of teeth. An outer planet gear has a centered rotational axle and an array of teeth engaged with the outer rack array of teeth. The planet gear axles are journalled for rotation on a support structure and the planet gears are linked for counter-rotation about their respective axles. The ratio of the inner rack array of teeth to the outer rack array of teeth is equal to the ratio of the velocity of the inner planet gear along the inner rack to the velocity of the outer planet gear along the outer rack. Linkage can be accomplished by directly meshing the teeth of the planet gears by use of a step gear or by use of a linkage including one or more rotating gears in addition to the planet gears. Such modifications permit the necessary counter-rotation of the planet gears while providing axle orientation and force transmitting structure suitable for specific applications. Any rack, together with its associated planet and other rotating gears and supporting structure and linkage, can be used as a planet gear of another rack.

A force applying mechanism is provided to apply unidirectional or opposing forces upon the axles of the planet gears to accomplish the variation of energy transfer into the rack. When forces to the axles of the planet gears oppose each other in a quantity to cause a balanced pressure between the teeth of the inner planet gear and the rotating gear with which it is engaged, maximum energy transfer occurs. When the opposing force is changed to a point where the forces are in line with each other, a minimum of energy will be transferred. Thus, the useful operating range of any given positive gear engagement transmission can be defined as the line extending at least between the balanced pressure force application point and the minimum energy transfer force application point. The orientation of this line can be changed by use of any suitable mechanical control mechanisms, such as hydraulic actuators, solenoids, counterweights, springs or vector changing structural configurations, to shift the balanced pressure point.

In a standard axle embodiment of the positive gear engagement transmission, the outer planet gear axle is disposed outwardly of the inner planet gear axle and force is applied by any suitable mechanism to the supporting and linking structure at a point inward of the inner planet gear axle so as to effectuate a transfer of power to the rack. Preferably, the force applying mechanism is adapted to apply force or to simulate the application of force to the supporting and linkage structure over a continuum of selectable points along a line extending inwardly from the outer planet gear axle toward the center hub of the rack. The line extends between the center of the outer planet gear axle and at least the point of balanced pressure between the teeth of the inner planet gear and the rotating gear with which it engages. In one application of this embodiment, the distance between the center of the outer planet gear axle and the balanced pressure point is substantially equal to the distance between the planet gear axles multiplied by the velocity ratio. However, a mechanical control mechanism can be used to shift the balanced pressure point.

In an inverted axle embodiment of the positive gear engagement transmission, the outer planet gear axle is disposed inwardly of the inner planet gear axle and the force applying mechanism acts at a point outward of the outer planet gear axle to effectuate the transfer of power to the rack. Preferably, the force applying mechanism is adapted to apply force to the supporting and linkage structure over a continuum of selectable points along a line extending outwardly from the outer planet gear axle away from the center hub of the rack. The line extends between the center of the outer planet gear axle and at least the point of balanced pressure between the teeth of the inner planet gear and the rotating gear with which it engages. In one application of this embodiment, the distance between the center of the outer planet gear axle and the balanced pressure point is also substantially equal to the distance between the planet gear axles multiplied by the velocity ratio. Again, a mechanical control mechanism may be used to shift the balanced pressure point.

In a coincident axle embodiment of the positive gear engagement transmission, the planet gear axles have coincident axes and the force applying mechanism acts at a point inward of the coincident axes to effectuate the transfer of power to the rack. As in the other embodiments, the force applying mechanism is adapted to apply force to the supporting and linkage structure over a continuum of selectable points along a line extending inwardly from the coincident axes toward the center hub of the rack. The line extends between the coincident axes and at least to the point of balanced pressure between the teeth of the inner planet gear and the rotating gear with which it engages. As with the other embodiments, a mechanical control mechanism may be used to shift the balanced pressure point.

BRIEF DESCRIPTION OF THE DRAWINGS

Other objects and advantages of the invention will become apparent upon reading the following detailed description and upon reference to the drawings in which:

FIG. 3 is a diametric cross-sectional view of a standard embodiment of the positive gear engagement transmission;

FIG. 4 is an exploded view of a portion of the transmission illustrated in FIG. 3;

While the invention will be described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION

The specific structural embodiments hereinafter described are illustrative of the principles on which this invention is based. If the direction and magnitude of forces between the axles of two planet gears which are directly or indirectly engaged with each other are controlled, the interfacing tooth pressure can be varied to control the amount of energy transferred from an input source to an output source.

Figure 1:
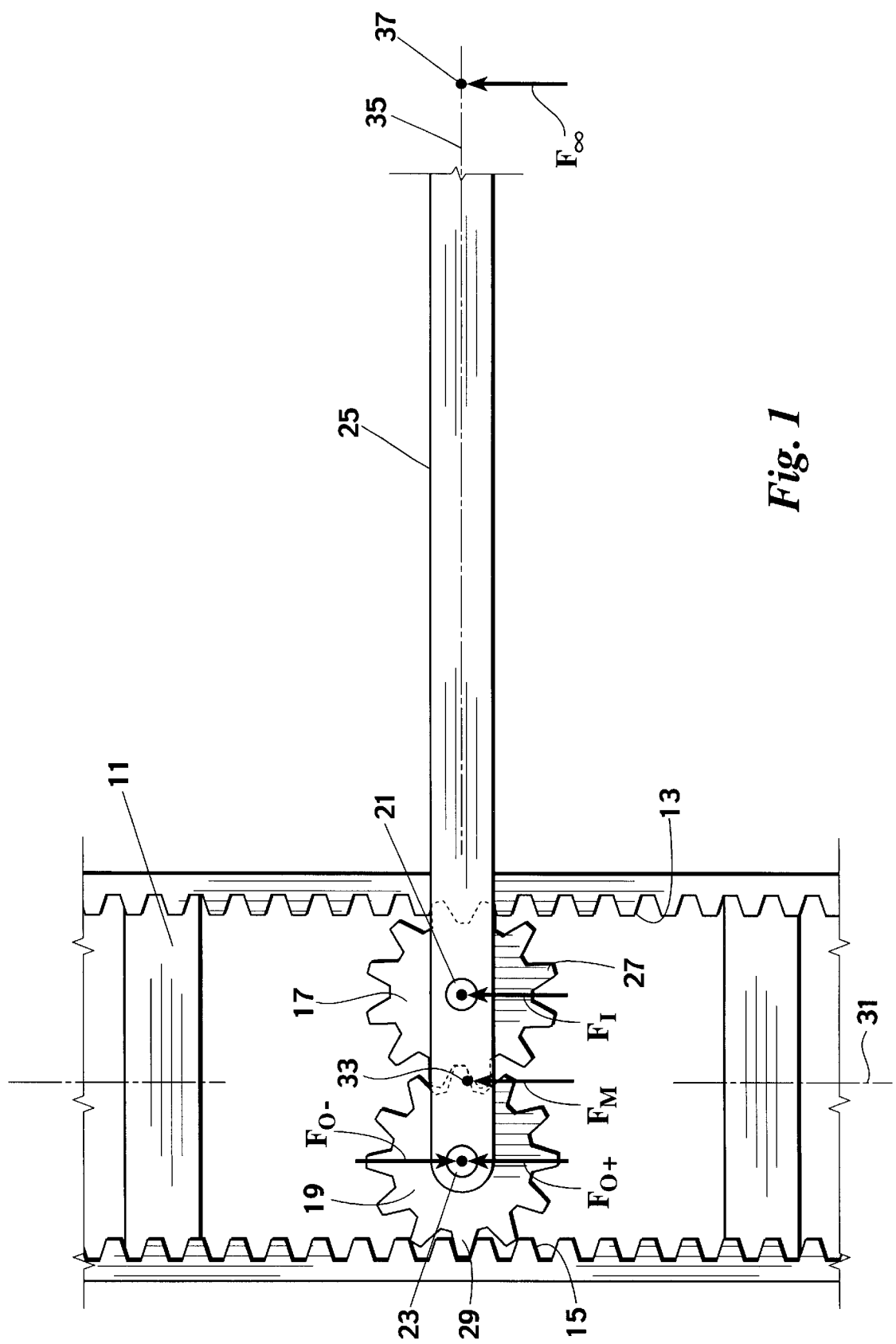
FIG. 1 is a partial top plan view of an infinite radius representation of the positive gear engagement transmission.

Turning first to FIG. 1, the principles of the positive gear engagement transmission can be understood. A linear rack 11 has parallel inner and outer arrays of opposed gear teeth 13 and 15. Inner and outer planet gears 17 and 19 are journalled for rotation on center axles 21 and 23 on a support structure or arm 25. The planet gears 17 and 19 are of equal radius. Their teeth 27 and 29 mesh with each other and also mesh with one of the arrays of opposing teeth 13 or 15 of the rack 11. If an external force $F_M$ is applied to the support structure or arm 25 in the direction of the longitudinal axis 31 of the rack 11 at the meshpoint 33 midway between the axles 21 and 23 of the planet gears 17 and 19 then, assuming the mass or weight of the support structure or arm 25 is negligible, equal and unidirectional forces $F_I$ and $F_{O+}$ are applied to each of the planet gear axles 21 and 23. Since there is no resistance to motion in the planet gears 17 and 19 at the mesh point 33, the planet gears 17 and 19 rotate in opposite directions. If there is resistance to motion of the rack 11, the inner planet gear 17 rotates clockwise and the outer planet gear 19 rotates counter-clockwise and the support structure or arm 25 advances in the direction of the rack axis 31 and the external force $F_M$ while an axis 35 extending through the center of the planet gear axles 21 and 23 remains perpendicular to the rack axis 31. If, instead of the force $F_M$ at the mesh point 33, an external force $F_\infty$ is applied to the support structure or arm 25 at a point 37 far inward of rack 11, then the force $F_I$ applied to the axle 21 of the inner planet gear 17 is still in the same direction as the external force $F_\infty$ but the force $F_{O-}$ applied to the axle 23 of the outer planet gear 19 is in the opposite direction. Assuming the rack 11 to have an infinite radius along the axis 35 extending through the planet gear axles 21 and 23, then the force $F_I$ against the axle 21 of the inner planet gear 17 is equal but opposite to the force $F_{O-}$ applied to the axle 23 of the outer planet gear 19. The meshing teeth 27 and 29 of the planet gears 17 and 19 thus have equal and opposite forces applied to them. Therefore, the planet gears 17 and 19 cannot rotate. Since the forces between the meshing teeth of each array of teeth 13 or 15 on the rack 11 and their respective planet gear teeth 27 or 29 are also opposed, the rack 11 is biased toward twisting or rotating in conjunction with the support structure or arm 25 and energy can be transferred from the support structure or arm 25 to the rack 11.

Figure 2:
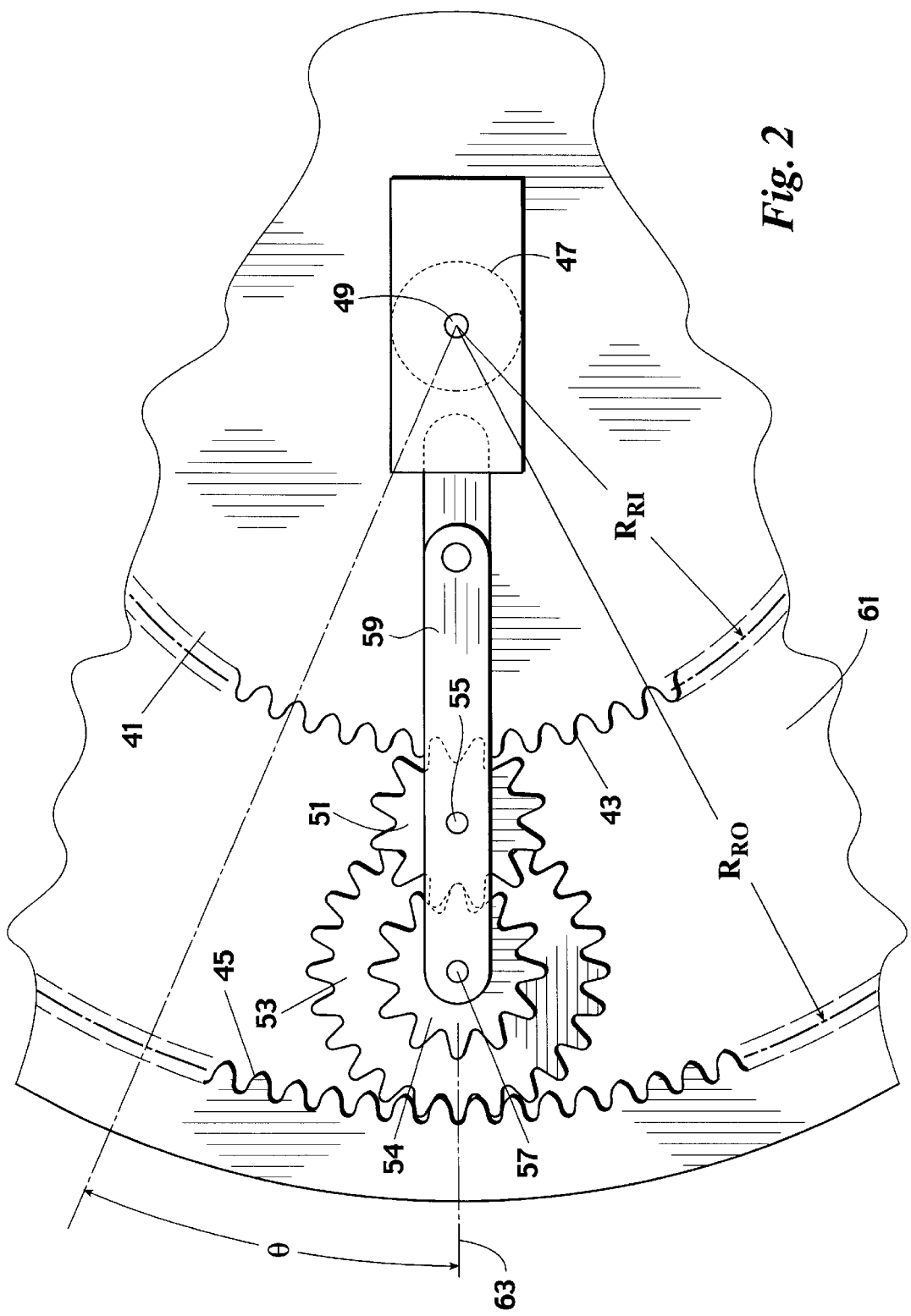
FIG. 2 is a top plan view of a finite radius, two planet gear standard embodiment of the positive gear engagement transmission with a step gear linkage.

Looking now at FIG. 2, the principles explained above are applied to a finite radius rack 41. The rack inner and outer arrays of teeth 43 and 45 (not completely shown) rotate in unison on a common hub 47 about a center axis 49. If the pitch radius $R_{RO}$ of the outer array 45 is one and one half times the pitch radius $R_{RI}$ of the inner array 43 and each array 43 and 45 has the same number of teeth 43 and 45 per inch then, for any given angle θ taken at the center axis 49 of the rack 41, there will be one and one half times the number of teeth in the arc of the outer array 45 as in the arc of the inner array 43. This ratio is not the only choice available and is herein used for convenience of description only. Any number of ratios could be selected for engineering purposes. The inner and outer planet gears 51 and 53 have radii $R_{PI}$ and $R_{PO}$, and, therefore, tooth velocities, chosen to match the rack array ratio. A linkage gear 54, fixed for rotation in unison with the outer planet gear 53, engages with the inner planet gear 51 so that the planet gears 51 and 53 counter rotate. If a force $F_M$ is applied at any point between the axles 55 and 57 of the planet gears 51 and 53 and there is resistance to motion of the rack 41, then the planet gears 51 and 53 will move along a circumferential path in the annular space 61 between the inner and outer rack teeth 43 and 45. If the point of force application is shifted toward the hub 47 of the rack 41, energy will be transferred from the support structure or arm 59 to the rack 41. Assuming the support structure or arm 59 provides a radial axis 63 from the center axis 49 of the hub 47 through the planet gear axles 55 and 57, the planet gear axles 55 and 57 will remain aligned on their radial axis 63 as they advance in the annular space 61. The alignment of the line extending through the planet gear axles 55 and 57, however, need not be radial in relation to the rack 41 as shown, but could extend at an angle to the radius from the rack center axis 49 to the inner planet gear axle 55.

Turning to FIGS. 3 and 4, the principles of the invention are incorporated in a standard embodiment of the transmission in which the outer planet gear axle is outward of the inner planet gear axle. In the embodiment shown, rotating or linking gears are used in addition to the inner and outer planet gears. As shown, a rack 71 with inner and outer arrays of teeth 73 and 75 is journalled for rotation on an axle 77 extending through the bottom wall 79 of the transmission housing 81. The inner planet gear 83 is supported for rotation on an axle 85 extending downwardly from the support structure or arm 87. As shown, the teeth 89 of the inner planet gear 83 are engaged with the inner array of teeth 73 on the rack 71. An outer planet gear 91 is journalled for rotation on an axle 93 extending through the support structure or arm 87. As shown, the outer planet gear 91 is above the support structure or arm 87 and the lower rim of the outer planet gear 91 is seated on an annular ring 95 below the outer array of teeth 75 on the rack 71. The teeth 97 of the outer planet gear 91 mesh with the outer array of teeth 75 on the rack 71. A linking gear 99 mounted on the lower end of the outer planet gear axle 93 has teeth 101 which engage with the teeth 89 of the inner planet gear 83. Since the outer planet gear 91 and the linking gear 99 rotate in unison and the linking gear 99 is meshed with the inner planet gear 83, the outer planet gear 91 rotates in the opposite direction as the inner planet gear 83. However, because the inner and outer planet gears 83 and 91 are not directly meshed, the distance between the inner and outer planet gear axles 85 and 93 need not necessarily be the sum of the radii of the inner and outer planet gears 83 and 91, the diameter of the linking gear 99 being selected to provide the desired velocity ratio between the planet gears 83 and 91. As shown, the arm 87 extends inwardly to engagement with an hydraulic actuator 103 which is in turn mounted on a shaft 105 journalled for rotation in the cover 107 of the transmission housing 81. The actuator shaft 105 and rack axle 77 are aligned on a common rotational axis 109 through the center of the transmission housing 81 and cover 107. As best seen in FIG. 3, the horizontal alignment of the support structure or arm 87 is maintained by the seating of the outer planet gear 91 on the annular ring 95 and the engagement of the support structure or arm 87 with the hydraulic actuator 103. Operation of the hydraulic actuator 103 applies the force necessary to the support structure or arm 87 to cause the desired energy transfer in the transmission.

Figure 5:
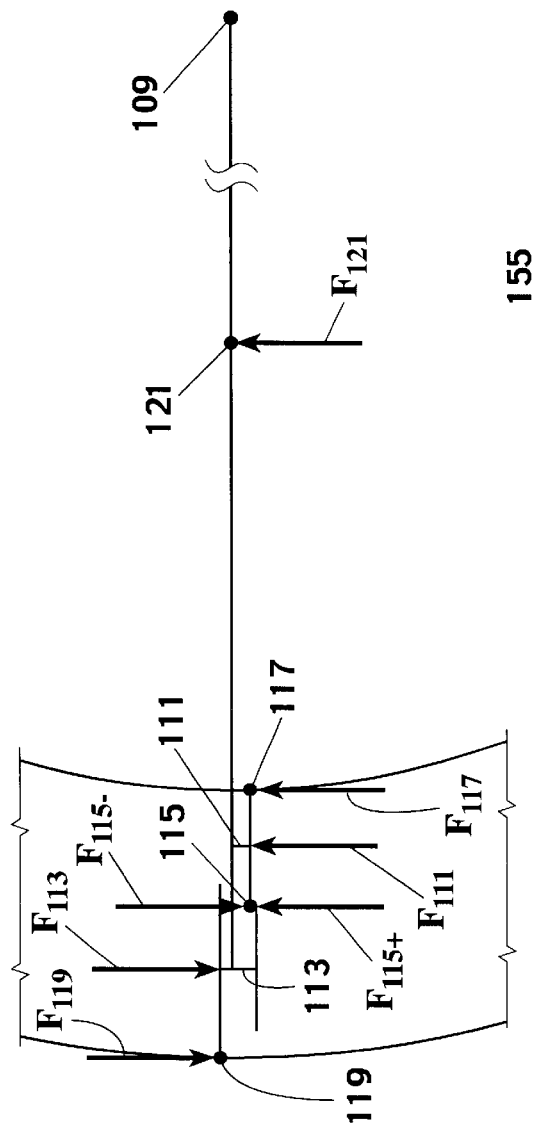
FIG. 5 is a one line diagram illustrating the interrelationship of pressure points in the operation of the transmission of FIGS. 3 and 4.

The gear engagement pressure points of the transmission shown in FIGS. 3 and 4 are illustrated in FIG. 5. There are pressure points 111 and 113 at the axles 85 and 93 of the planet gears 83 and 91, respectively. There is a pressure point 115 where the inner planet gear 83 and the linking gear 99 mesh, a pressure point 117 where the inner planet gear 83 meshes with the inner array of rack teeth 73, a pressure point 119 where the outer planet gear 91 meshes with the outer array of rack teeth 75 and a pressure point 121 where a force $F_{121}$ would be applied to the support structure or arm 87. Assume that the force $F_{121}$ is applied at a pressure point 121 at a sufficient distance from the axle pressure points 111 and 113 and in a sufficient magnitude to result in an upward force $F_{111}$ at the inner planet gear axle pressure point 111 of, for example, three pounds and a downward force $F_{113}$ at the outer planet gear axle pressure point 113 of two and one half pounds. Then, since the distances to the inner planet gear mesh points 115 and 117 are the same relative to the inner planet gear axle pressure point 111, an upward force $F_{117}$ of one and one half pounds would act at the inner rack array pressure point 117 and an upward force $F_{115+}$ of one and one half pounds would act at the linking and inner planet gear mesh point 115. Also, since the distance from the outer rack array pressure point 119 to the outer planet gear axle pressure point 113 is one and one half times the distance from the linking and inner planet gear pressure point 115 to the outer planet gear axle pressure point 113, a force $F_{119}$ of one pound in a downward direction will act at the outer rack array pressure point 119 and a force $F_{115-}$ of one and one half pounds in a downward direction will act at the linking and inner planet gear pressure point 115, taken in relation to the outer planet gear axle pressure point 113. The forces $F_{115+}$ and $F_{115-}$ of one and one half pounds upward and downward applied at the linking and inner planet gear pressure point 115 therefore effectively cancel each other. Therefore, the inner planet gear 83 and the linking gear 99 are in a balanced condition in that they are not influenced to rotate about their own axles 85 and 93. In the example described, an upward force $F_{121}$ of approximately one-half pound at a distance from the inner planet axle pressure point 111 equal to approximately five times the distance between the planet gear axles 85 and 93 would be required. For a standard embodiment of the transmission, the balance point can be approximated using the equation $\Delta_{BP} \times (R_{RO} - R_{RI}) = \Delta d(R_{RO} + R_{RI})$, where:

$\Delta_{BP}$ is the distance between the balance point and the inner planet gear axle;

$\Delta_d$ is the distance between the planet gear axles;

$R_{RO}$ is the radius to the outer array of teeth on the rack; and $R_{RI}$ is the radius to the inner array of teeth on the rack. Given this information, one skilled in the art could configure the planet and linking gears 83, 91 and 99 so that the distance between the inner planet gear axle 83 and the outer planet gear axle 93 would be able to allow a balance point 121 to apply power. Thus, the input shaft 105 could be used to couple rotational power to the rack 71. Changing ratios will change the distance between the balanced pressure point 121 and the inner planet gear axle pressure point 111. For instance, for a ratio of 2 to 1 the distance between these points 121 and 111 would be approximately three times the distance between the axle pressure points 111 and 113.

Figure 6:
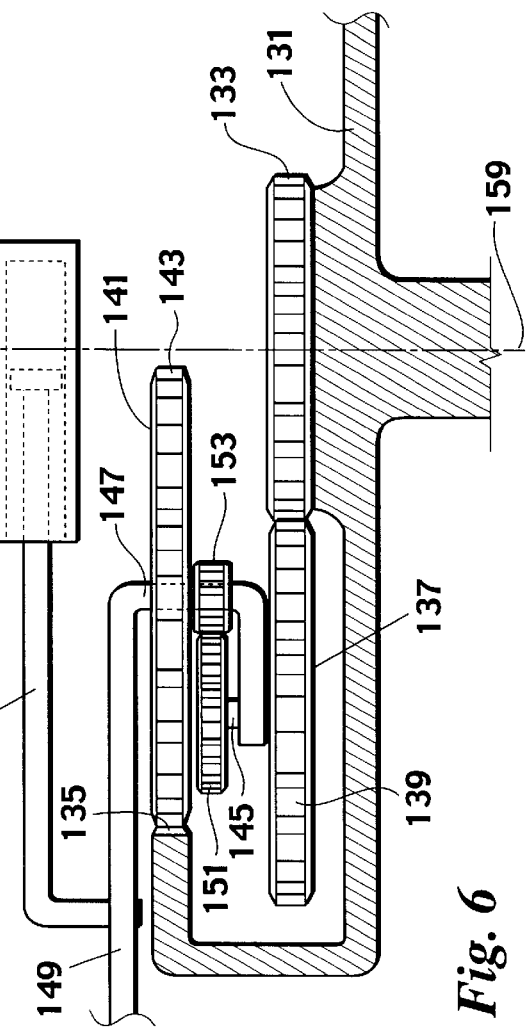
FIG. 6 is an exploded diametric cross-sectional view of a portion of an inverted axle embodiment of the positive gear engagement transmission.

An inverted axle embodiment of the positive gear engagement transmission is illustrated in FIG. 6. The rack 131 has an inner array of teeth 133 and an outer array of teeth 135. The inner planet gear 137 has its teeth 139 meshed with the rack inner array 133. The outer planet gear 141 has its teeth 143 meshed with the rack outer array 135. As shown, the axle 145 of the inner planet gear 137 lies outwardly of the axle 147 of the outer planet gear 141. The linkage between the inner planet gear 137 and the outer planet gear 141 includes the support structure 149 for the planet gear axles 145 and 147, a linking gear 151 which is journalled for simultaneous rotation with the inner planet gear 139 and another linking gear 153 which is fixed for simultaneous rotation with the outer planet gear 141. The ratio of radii of the linking gears 151 and 153 is selected to provide the desired velocity ratio of the inner and outer planet gears 139 and 141. As shown, the force applied to the linkage 149 can be varied by use of an hydraulic actuator 155 which rotates about the rack center axis 159. The pressure points of this configuration can be determined using a similar analysis to that provided with respect to FIG. 5. This embodiment illustrates one configuration in which the inner planet gear axle 145 is outside of the outer planet gear axle 147. Any number of linking gears could be incorporated in any number of configurations. For the inverted axle embodiment of the transmission, the balance point can be approximated using the same equation as applied to the standard embodiment.

Figure 7:
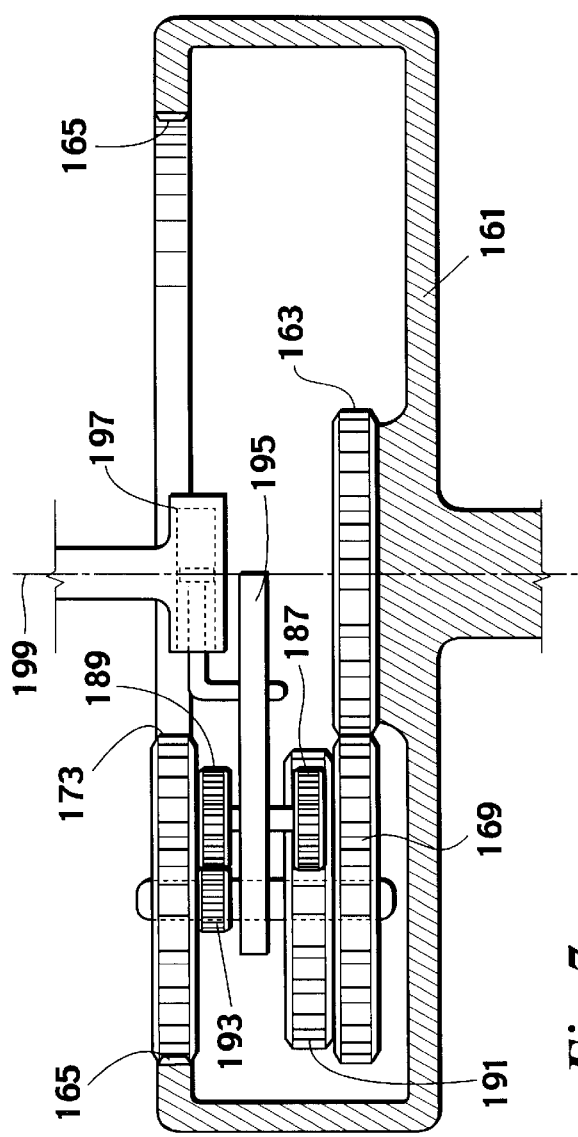
FIG. 7 is a diametric cross-sectional view of a coincident axle embodiment of the positive gear engagement transmission.
Figure 8:
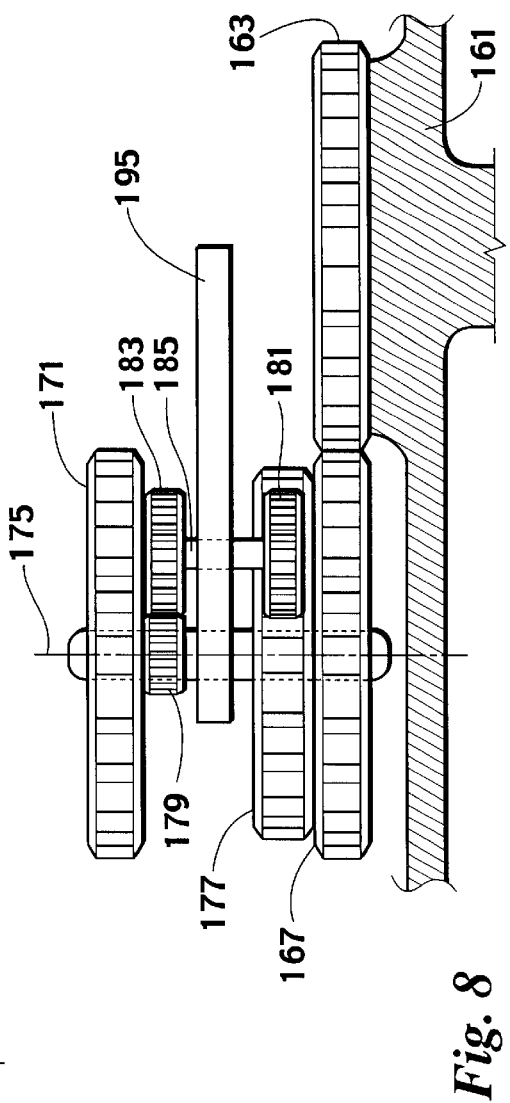
FIG. 8 is an exploded view of a portion of the transmission illustrated in FIG. 7.

A coincident axle embodiment of the positive gear engagement transmission is illustrated in FIGS. 7 and 8. The rack 161 has an inner array of teeth 163 and an outer array of teeth 165. The inner planet gear 167 has its teeth 169 engaged with the inner rack array 163. The outer planet gear 171 has its teeth 173 meshed with the outer rack array 165. The inner planet gear 167 and outer planet gear 171 are aligned for rotation about a coincident axis 175. The linkage between the inner and outer planet gears 167 and 171 consists of first and second linking gears 177 and 179 fixed for simultaneous rotation with the inner and outer planet gears 167 and 171, respectively. Third and fourth linking gears 181 and 183 mounted for rotation on a common shaft 185 have their teeth 187 and 189, respectively, engaged for rotation with the first and second linking gear teeth 191 and 193, respectively, and their radii ratio is selected to provide the desired velocity ratio of the inner and outer planet gears 167 and 171. As shown, the application of force to the linkage structure 195 supporting the gear axles can be varied by use of an hydraulic actuator 197 fixed for rotation about the rack center axis 199. Once again, the pressure points involved in this embodiment can be analyzed in similar fashion to the analysis provided hereinbefore with respect to FIG. 5. The coaxial embodiment shown is given as an example, and many other configurations using any number of linking gears will be readily designed using the principles herein discussed.

Figure 9:
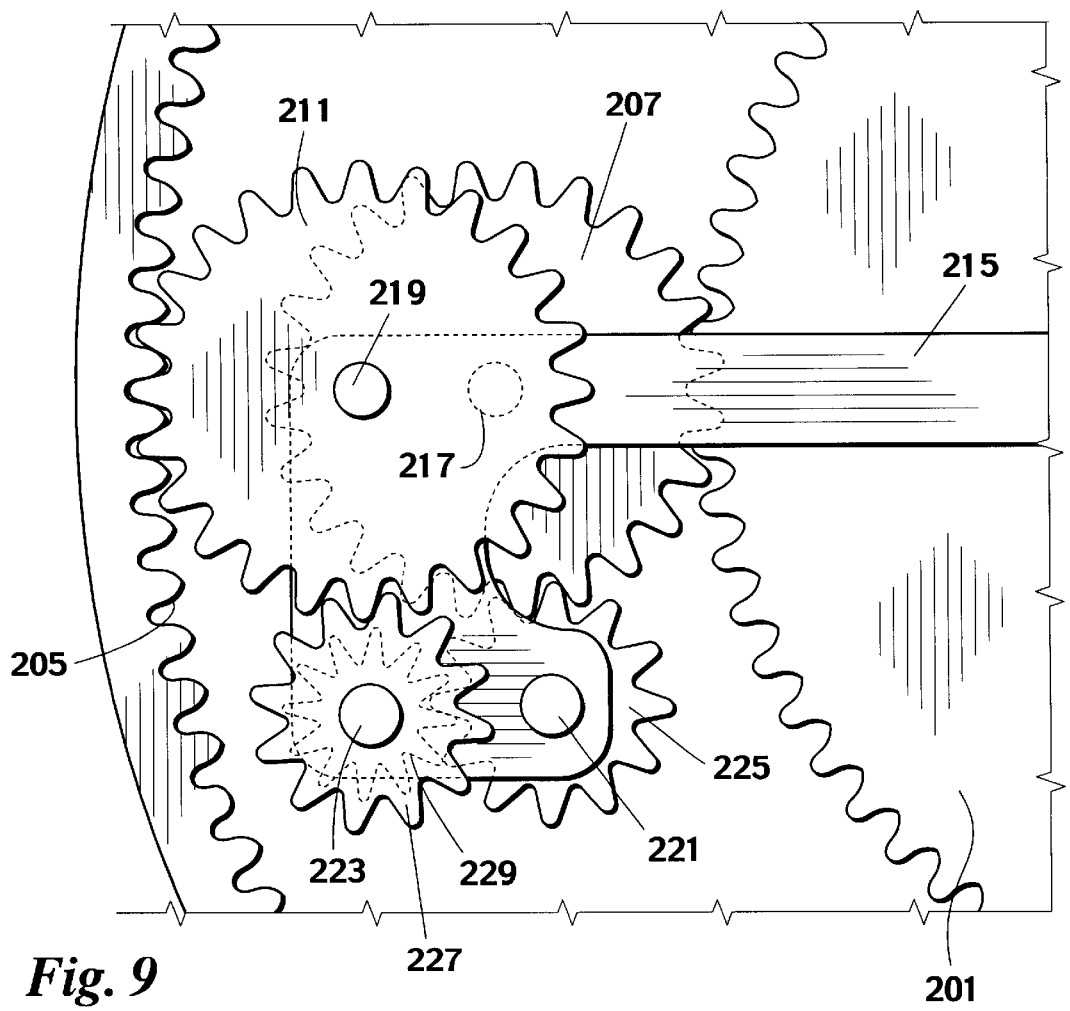
FIG. 9 is an exploded top plan view of a portion of an embodiment of a transmission which is readily adaptable to standard, inverted or coincident axle operation.
Figure 10:
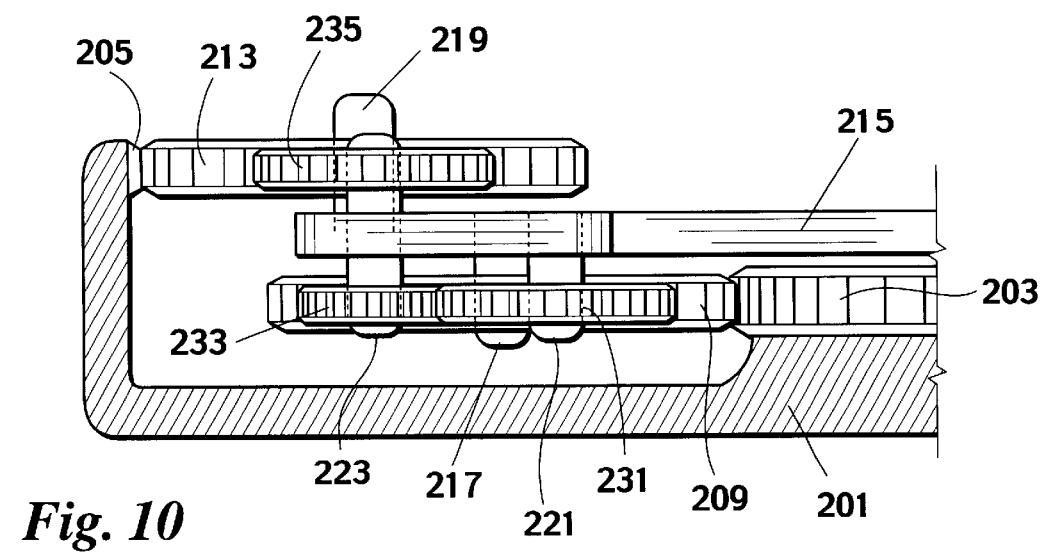
FIG. 10 is a front elevation view of the portion of the transmission illustrated in FIG. 9.

FIGS. 9 and 10 illustrate an embodiment of a transmission which is readily adaptable to standard, inverted or coincident axle operation. As shown, the rack 201 has an inner array of teeth 203 and an outer array of teeth 205. The inner planet gear 207 has teeth 209 which mesh with the inner rack array 203. The outer planet gear 211 has an array of teeth 213 which mesh with the outer rack array 205. The support structure 215 supports the inner planet gear axle 217, the outer planet gear axle 219, and the linking planet gear axles 221 and 223. The linking gear axles 221 and 223 support linking gears 225 and 227, respectively. A third linking gear 229 is mounted on the axle 223 of the second linking gear 227 for simultaneous rotation therewith. The teeth 231 of the first linking gear 225 mesh with the teeth 209 of the inner planet gear 207 and with the teeth 233 of the third linking gear 229. The teeth 235 of the second linking gear 227 engage with the teeth 213 of the outer planet gear 211. The ratio of the radii of the linking gears 229 and 227 is chosen to provide the desired velocity ratio of the inner and outer planet gears 207 and 211. This configuration of axles 217, 219, 221 and 223 and linking gears 225, 227 and 229 with the support structure 215 affords the necessary rotational motions of the planet gears 207 and 211 with the rack arrays 203 and 205. By appropriate selection of the diameters of the gears, including the planet and linking gears 207, 211, 225, 227 and 229, to shift the position of the axles 217 and 219 of the inner and outer planet gears 207 and 211, the desired standard, inverted or coaxial embodiment of the invention can be achieved.

Figure 11:
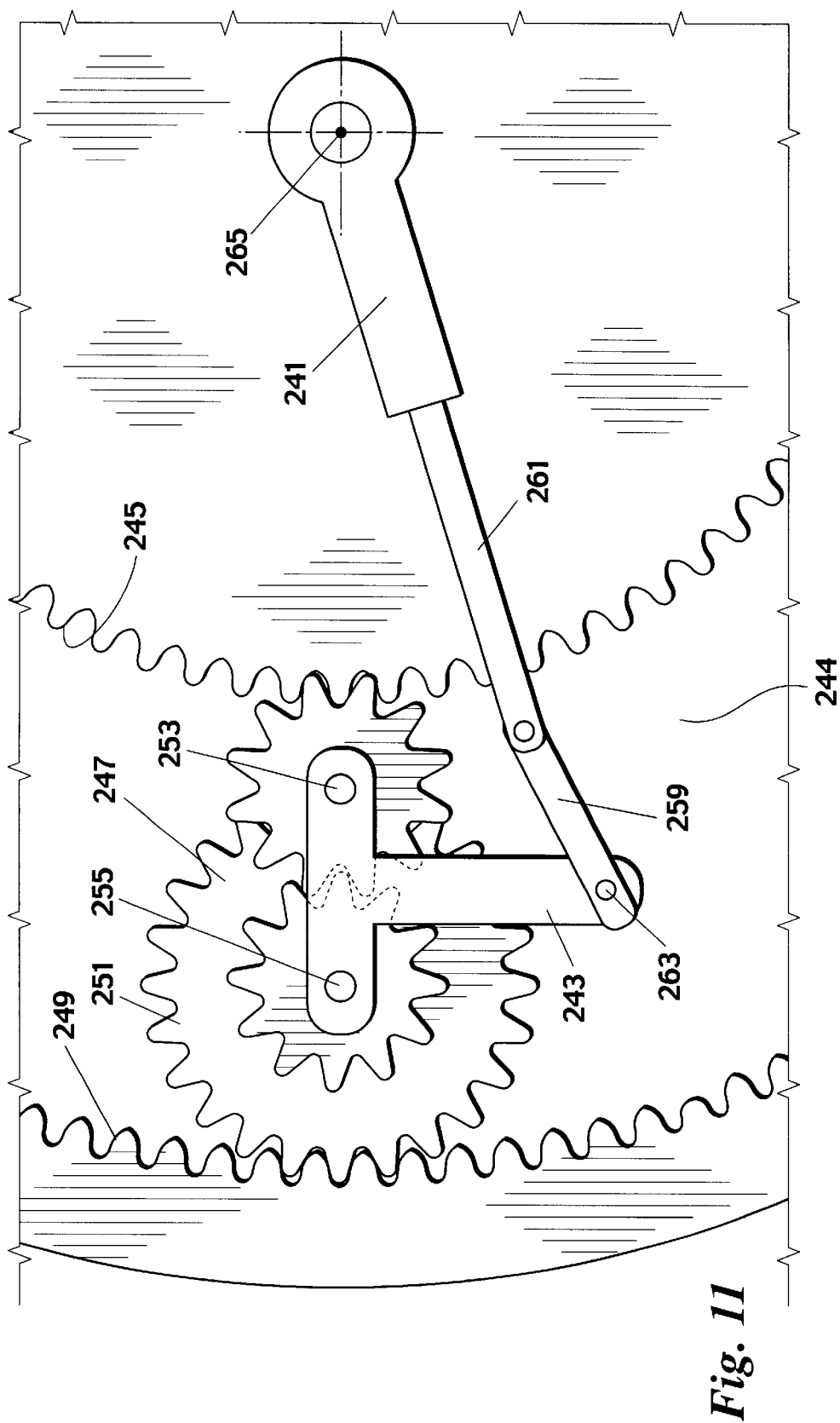
FIG. 11 is a top plan view of a positive gear engagement transmission utilizing a hydraulic actuator.

Looking at FIG. 11, the use of an hydraulic actuator 241 to apply force to the linkage 243 is illustrated. The rack 244 has an inner array of teeth 245 which mesh with the teeth of the inner planet gear 247. The rack outer array of teeth 249 meshes with the teeth of the outer planet gear 251. The axles 253 and 255 on the support structure 243 facilitate rotation of the inner planet gear 247 and the outer planet gear 251, respectively. The axle 255 also supports a linking gear 257 for simultaneous rotation with the outer planet gear 251. The teeth of the linking gear 257 are meshed with the teeth of the inner planet gear 247. The ratio of radii of the outer planet gear 251 and the linking gear 257 is chosen to provide the desired velocity ratio of the outer planet gear 251 and the inner planet gear 247. As shown, the support structure 243 is T-shaped with the cross portion of the T supporting the axles 253 and 255 at either end. The lower end of the upright portion of the T is connected by a linkage arm 259 to the piston arm 261 of the hydraulic actuator 241. The pivotal connection of the linking arm 259 between the actuator arm 261 and the T support 243 permits the hydraulic actuator 241 to exert the desired force on the support structure 243 as the support structure 243 moves with the inner and outer planet gears 247 and 251 between the rack arrays 245 and 249. The forces applied at the pressure points of this configuration can also be determined in similar fashion to that explained in relation to FIG. 5, it being apparent that the forces applied, for example, at the axles 253 and 255 can be calculated applying fundamental laws of vector analysis to the structure. Many other configurations of the linkage between the hydraulic actuator 241 and the planet gear support structure 243 will be apparent upon considering the present teachings.

FIG. 11 demonstrates that the realized balance point 121 of FIG. 5 could be changed by using hydraulic controls to augment pressure points. A spring or counterweight could just as easily be implemented. Gear clusters, such as, but not limited to, those shown in FIGS. 4, 6 and 9 could be used to shift planet gear axles closer to each other, thereby reducing the distance between pressure points for a gear balanced condition and resulting in a shorter distance to the balanced pressure point. A counter weight system would allow a simple method of using centripetal force to engage a rack into motion after sufficient speed had been obtained by its arm. In the configuration of FIG. 11, using centripetal force at the attachment point 263 for engagement control would require that the arm 261 be rotated counterclockwise. The support structure 243 at the end of the arm 261 allows forward and reverse pressures to be applied to the axles of the planet gears by operator control. The arm 261 can apply rotational force from an input source. The location of the attachment point 263 will determine how much the input rotational force from the arm 261 influences the forward and reverse pressures being applied to the axles 253 and 255 of the planet gears. When the attachment point 263 is somewhere between the axles 253 and 255, changes in the arm rotational torque will not have as much influence over the coupling of power to the gear assembly as it would if the support structure 243 was lengthened inward so that the attachment point 263 were closer to the input shaft 265. If the arm 261 is part of the input shaft 265 and rotates with it from an input source then, depending on the length of the arm 261, the linkage arm 259 will change its angle relative to the support structure 243. This will determine the forward and reverse pressure to the planet gear axles 253 and 255 relative to the total torque applied by the arm 261 to rotate the planet gears 247 and 251 annularly around the space between the rack arrays of teeth 245 and 249. This relationship determines how much rotational energy will be transmitted from the input shaft 265 out to the rack 244. A second arm from the input shaft 265 attached to the support structure 243 could also be used for transfer of rotational power, leaving the hydraulic actuator 241 to be required only to adjust the forward and reverse pressure to the planet gear axles 255 and 253, thus altering a neutral or engaged condition.

In the embodiments shown, only one set of planet gear assemblies is used in any transmission. However, a plurality of planet gear assemblies can be combined in any application.

Thus, it is apparent that there has been provided, in accordance with the invention, a positive gear engagement transmission that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A transmission comprising:
    a circular rack journalled for rotation about a center axle and having inner and outer arrays of teeth;
    an inner planet gear having a centered rotational axle and an array of teeth engaged with said inner rack array of teeth;
    an outer planet gear having a centered rotational axle and an array of teeth engaged with said outer rack array of teeth; and
    means supporting said planet gear axles and linking said planet gears for counter-rotation about their respective said axles, a ratio of said inner rack array of teeth to said outer rack array of teeth being equal to a ratio of a velocity of said inner planet gear along said inner rack to a velocity of said outer planet gear along said outer rack.

2. A transmission according to claim 1, said outer planet gear axle being disposed outwardly of said inner planet gear axle.

3. A transmission according to claim 2 further comprising means for applying a force to said supporting and linking means at a point inward of said inner planet gear axle so as to effectuate a transfer of power to said rack.

4. A transmission according to claim 3, said force applying means adapted to apply force to said supporting and linking means over a continuum of selectable points along a line extending inwardly from said outer planet gear axle.

5. A transmission according to claim 4, said line extending inwardly from said outer planet gear axle to a point of balanced pressure between teeth of said inner planet gear and a gear engaged therewith.

6. A transmission according to claim 5, a distance between said inner planet gear axle and said balanced pressure point being approximated by the equation $\Delta_{BP} \times (R_{RO}-R_{RI}) = \Delta d (R_{RO}+R_{RI})$, where:

$\Delta_{BP}$ is the distance between the balance point and the inner planet gear axle;

$\Delta_d$ is the distance between the planet gear axles;

$R_{RO}$ is the radius to the outer array of teeth on the rack; and $R_{RI}$ is the radius to the inner array of teeth on the rack.

7. A transmission according to claim 5 further comprising control means for mechanically shifting said balanced pressure point.

8. A transmission according to claim 1, said outer planet gear axle being disposed inwardly of said inner planet gear axle.

9. A transmission according to claim 8 further comprising means for applying a force to said supporting and linking means at a point outward of said outer planet gear axle so as to effectuate a transfer of power to said rack.

10. A transmission according to claim 9, said force applying means adapted to apply force to said supporting and linking means over a continuum of selectable points along a line extending outwardly from said outer planet gear axle.

11. A transmission according to claim 10, said line extending outwardly from said outer planet gear axle to a point of balanced pressure between teeth of said inner planet gear and a gear engaged therewith.

12. A transmission according to claim 11, a distance between said inner planet gear axle and said balanced pressure point being approximated by the equation $\Delta_{BP} \times (R_{RO}-R_{RI}) = \Delta d (R_{RO}+R_{RI})$, where:

$\Delta_{BP}$ is the distance between the balance point and the inner planet gear axle;

$\Delta_d$ is the distance between the planet gear axles;

$R_{RO}$ is the radius to the outer array of teeth on the rack; and $R_{RI}$ is the radius to the inner array of teeth on the rack.

13. A transmission according to claim 11 further comprising control means for mechanically shifting said balanced pressure point.

14. A transmission according to claim 1, said planet gear axles having coincident axes.

15. A transmission according to claim 14 further comprising means for applying a force to said supporting and linking means at a point inward of said coincident axes so as to effectuate a transfer of power to said rack.

16. A transmission according to claim 15, said force applying means adapted to apply force to said supporting and linking means over a continuum of selectable points along a line extending inwardly from said coincident axes.

17. A transmission according to claim 16, said line extending from said coincident axes to at least a point of balanced pressure between teeth of said inner planet gear and a gear engaged therewith.

18. A transmission according to claim 17 further comprising control means for mechanically shifting said balanced pressure point.

19. A method of transferring power of variable torque and speed from an input source to an output source over a continuously variable input to output ratio comprising the steps of:
    driving one of a rack and a planet gear assembly engaged with the rack;
    transferring power from the driven one of the rack and the planet gear assembly to the other of the rack and the planet gear assembly; and
    applying a variable control force to the planet gear assembly to vary the ratio between the power of the driven one of the rack and the planet gear assembly and the power from the other of the rack and the planet gear assembly.

20. A method of transferring power of variable torque and speed from an input source to an output source over a continuously variable input to output ratio comprising the steps of:

establishing a ratio of radii of circular rack inner and outer arrays of teeth;

establishing a ratio of radii of an inner planet gear having teeth meshed with the rack inner array of teeth and an outer planet gear having teeth meshed with the rack outer array of teeth;

linking the planet gears for counter-rotation about axles radially aligned in relation to a center of the rack; and applying a control force to a continuously variable point along a line fixed in relation to the planet gear axles to vary the ratio between an input force applied to one of the rack and the planet gear assemblies and an output force transmitted from the other of the rack and the planet gear assemblies.

* * * * *